(No Model.) 2 Sheets—Sheet 1.
G. H. MOORE.
APPARATUS FOR AUTOMATICALLY CONTROLLING THE OPERATION OF PRESSURE VALVES.
No. 392,218. Patented Nov. 6, 1888.
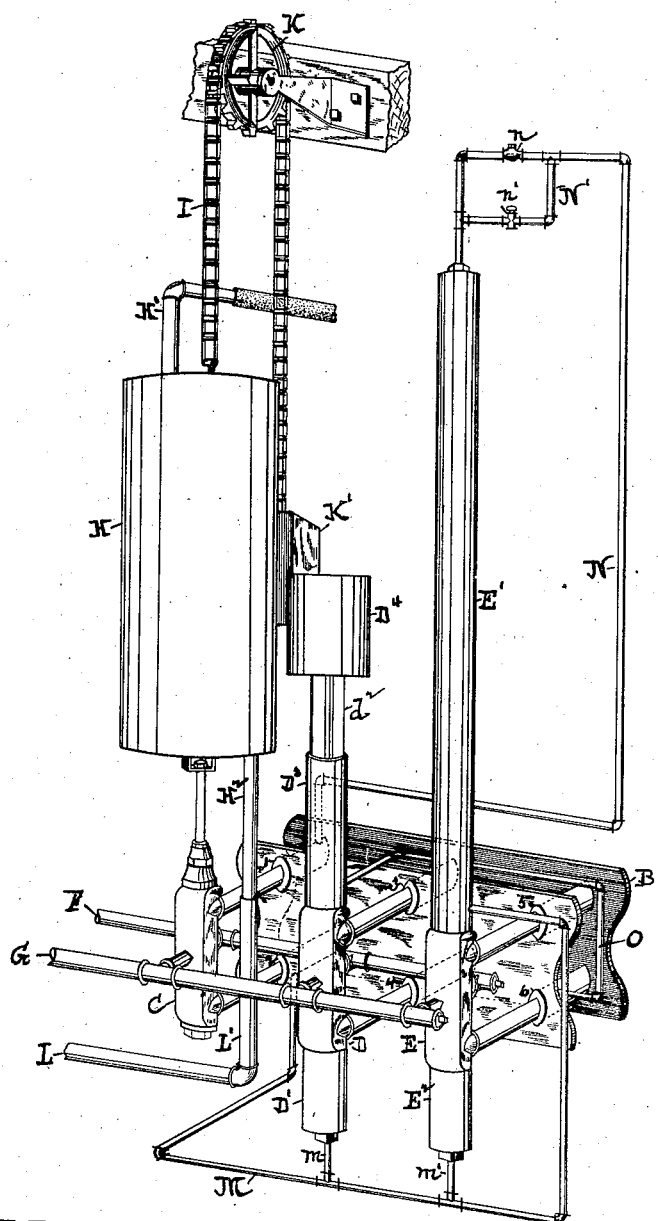
Fig. I.
Witnesses
H. Gardner.
J. E. Chapman.
Inventor
G. H. Moore,
By Hawes & Chapman
Attorneys.

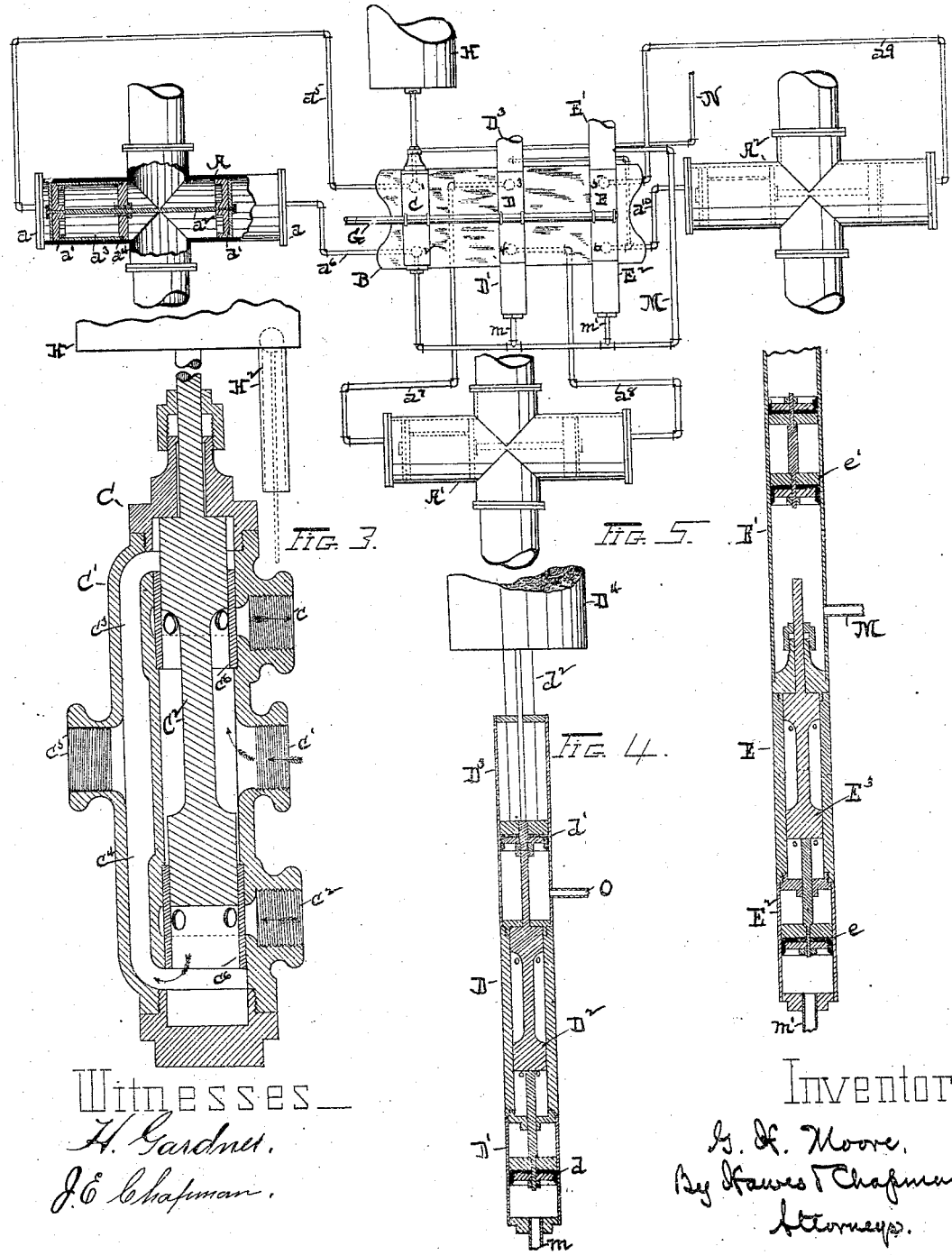

UNITED STATES PATENT OFFICE.

GEORGE H. MOORE, OF NORWICH, CONNECTICUT.

APPARATUS FOR AUTOMATICALLY CONTROLLING THE OPERATION OF PRESSURE-VALVES.

SPECIFICATION forming part of Letters Patent No. 392,218, dated November 6, 1888.

Application filed March 19, 1888. Serial No. 267,605. (No model.)

*To all whom it may concern:*

Be it known that I, GEORGE H. MOORE, of Norwich, in the county of New London and State of Connecticut, have invented a new and useful Improvement in Apparatus for Automatically Controlling the Operation of Pressure-Actuated Valves, of which the following is a specification, reference being had to the accompanying drawings, forming part thereof.

In an application for Letters Patent filed by me on the 17th day of June, A. D. 1887, and serially numbered 241,577, I have shown, described, and claimed an apparatus for regulating the operation of the several valves governing the inlet and outlet openings of a filter in such manner as to automatically effect the washing of the filter-bed as often as said bed becomes clogged by the impurities eliminated from the water during the process of filtration.

The object of my present invention is to improve the construction of the regulating apparatus shown in my said prior application, to the end that all of its movements may be rendered positive and its effectiveness correspondingly increased.

The invention therefore consists in the apparatus constructed as hereinafter fully described, and particularly pointed out in the claims.

Referring to the drawings, in which like letters designate like parts in the several figures, Figure 1 is a perspective view of the apparatus. Fig. 2 is a front view of the apparatus, three pressure-actuated primary valves, and the pipe-connections between the apparatus and said valves. Figs. 3, 4, and 5 are vertical sectional views of the three secondary valves forming part of the apparatus.

As my present invention relates wholly to the apparatus for regulating the operation of pressure-actuated valves, I have deemed it unnecessary to show a filter in the drawings, but have shown in Fig. 2 three valves, (designated by the letters A A' A², respectively,) adapted to be operated by fluid or liquid under pressure, and have shown the apparatus connected by pipes with said valves, as hereinafter described, for the purpose of illustrating the operation of the apparatus in connection with pressure-actuated valves generally.

As shown, the valves A A' A², which I will call "primary valves," are composed of a shell having upon opposite sides thereof cylinders $a$ $a$, and within each of said cylinders is located a piston, $a'$, which pistons are connected with each other by a stem, $a^2$. The gate or closing device of the valve consists of an expansible cylinder, $a^3$, mounted at one end upon one of said pistons, and at its opposite end upon a disk, $a^4$, secured to stem $a^2$ between the pistons, whereby by admitting fluid or liquid under pressure to the outer ends of cylinders $a$ alternately said pistons and expansible cylinder are moved in such manner as to cause the latter to open and close the water-way through the shell. As this form of valve forms the subject of a separate application for Letters Patent filed by me on the 20th day of May, A. D. 1887, and serially numbered 238,855, it need not be more particularly described herein; and it will be understood that said valve is shown as one example merely of pressure-actuated valves, and that so far as my present invention is concerned any form of valve adapted to be opened and closed by fluid or liquid under pressure could be substituted for the one shown.

The regulating apparatus, which I will now proceed to describe, is designed to be located between said primary valves and the primary source of fluid or liquid under pressure, and its office is to regulate the passage of said fluid or liquid to said valves in such manner as to cause the latter to operate in a predetermined sequence.

The letter B designates a bracket, which supports a series of closed tubes, designated by the numbers 1 to 6, inclusive, and arranged in pairs, as shown. These tubes, which I will call "distributing-reservoirs of power," distribute the fluid or liquid under pressure to the primary valves by means of suitable pipes, and the admission of said fluid or liquid to and its exhaustion from said reservoirs is governed by a series of secondary valves, each secondary valve being connected with and governing two reservoirs, as follows: valve C with reservoirs 1 2, valve D with reservoirs 3 4, and valve E with reservoirs 5 6.

Referring to Fig. 3, the secondary valve C is composed of a shell, C', having a central chamber, into which open at the rear side of the valve three ports, $c\ c'\ c^2$, and communicating with which chamber, at the front side of the valve, by means of ducts $c^3\ c^4$, is a port, $c^5$. I prefer to insert bushings $c^6$ within the valve-chamber adjacent to ports $c\ c^2$, said bushings being provided with a series of perforations located in the plane of said ports, but out of alignment therewith, and to form an annular recess within the inner wall of the valve in the plane of each of said bushings, as shown, whereby an indirect communication between said ports $c\ c^2$ and the valve-chamber is secured to prevent the fluid or liquid under pressure from exerting a binding action against the valve-plug during the exhaust movement, as hereinafter described.

The valve-plug $C^2$ has its ends fitted to the bore of said bushings $c^6$, while its central portion is reduced in size, as shown, and said plug is of such length that when in its highest position, as shown in Fig. 3, ports $c\ c'$ will be in open communication with each other. Port $c^2$ will be in open communication with duct $c^4$ and port $c^5$, while duct $c^3$ will be closed; and when in its lowest position ports $c'\ c^2$ will be in open communication with each other, port $c$ in open communication with duct $c^3$ and port $c^5$, while duct $c^4$ will be closed. Reservoir 1 is connected with said valve C by means of a short pipe leading from port $c$, and reservoir 2 by means of a similar pipe leading from port $c^2$. A pipe, F, leading from the primary source of fluid or liquid under pressure—as, for example, from the street-main—communicates with said valve by means of a short branch pipe leading from port $c'$, and a similar branch pipe leads from port $c^5$ to a waste-pipe, G, as shown in Fig. 1.

The construction of valve C, as thus described, is common to each of the three valves C D E, said latter valves being similarly connected to their reservoirs 3 4 and 5 6, respectively, and also to pipes F G. The primary valves A A' A² each having their opposite cylinders connected to one of said pairs of reservoirs, it follows from the construction of the secondary valves, as just described, that when the plug of either of the latter valves is in its highest position the fluid or liquid under pressure will pass from pipe F through said valve to the upper reservoir connected therewith, from whence it will pass to one of the cylinders of the primary valve connected with that pair of reservoirs, moving the gate of such primary valve to open or close the latter, as the case may be, while the fluid or liquid will exhaust from the opposite cylinder of said primary valve through the lower reservoir and said secondary valve to pipe G. It follows, furthermore, that when the plug of either of said secondary valves is in its lowest position this movement of the motive fluid or liquid will be reversed—that is to say, it will then pass from pipe F to the lower reservoir connected with said valve, and from thence to the opposite cylinder of the primary valve, moving the gate thereof in the reverse direction, while the exhaust movement will occur through the upper reservoir and said secondary valve to pipe G. Provision is thus made for controlling the movement of the primary valves by the movement of the secondary valves, and it only remains for me to describe the means by which the secondary valves are themselves operated, and the means by which their movements are made to depend upon each other in such manner as to cause them to operate in a predetermined sequence.

The letter H designates a hollow cylindrical receptacle secured to the stem of plug $C^2$ of valve C above the valve-shell, and I designates a chain secured at one end to said cylinder H, said chain passing over a pulley, K, and having secured to its opposite end a weight, K', which normally retains said cylinder and valve-plug $C^2$ in their highest position. A pipe, H', communicates with the interior of cylinder H, at the top thereof, and a pipe, H², leading from said cylinder, at the bottom thereof, projects into the vertical extension L' of a waste-pipe, L, the mouth of said pipe H² being normally closed by a ball-valve, as shown by broken lines in Fig. 3. A rod depending from said ball-valve, as shown, opens said valve when the cylinder H descends, the end of said rod being thereby brought into contact with the bottom of pipe L'.

As thus far described, the construction of the regulating apparatus is identical with that shown and described in my said application, Serial No. 241,577, and in that case the pipe H' leads from the upper compartment of a filter, whereby the excess of water in the filter, caused by a clogged condition of the filter-bed, is conducted by said pipe into cylinder H, and by filling the latter causes it to descend. So far as my present invention is concerned, said pipe H' may lead from a filter in the same manner, or may lead from the street-main, or from any convenient source of water-supply, and the passage of water therethrough to the cylinder can be governed by any suitable manually-operated valve located in said pipe.

As previously stated, the valve governing the outlet-pipe H² is opened by the descent of the cylinder, permitting the water to escape from the latter into waste-pipe L, and the time required to empty the cylinder will be governed by the size of said outlet-pipe H², whereby the time during which the cylinder will remain in its lowest position can be accurately predetermined.

In the apparatus described in my said application, Serial No. 241,577, the second valve, corresponding to valve D, is also provided with a cylinder and weight for operating it, while the third valve, corresponding to valve E, is provided with a weight to normally retain its plug in its lowest position, said plug being moved upwardly by the fluid or liquid under pressure distributed to said valve from the reservoirs governed by the first and second valves.

In my present invention the valve D, which is shown in section in Fig. 4, is provided with a cylinder, D', at the bottom of its shell, containing a piston, d, the stem of which extends through the bottom of the valve-shell, where it is adapted to bear against the bottom of plug $D^2$. Said valve is also provided with a cylinder, $D^3$, at the top of its shell, and the stem of plug $D^2$ is extended through the top of the shell into said cylinder and connected at its upper end with piston $d'$ within the latter. A weight, $D^4$, is secured to the upper end of a rod, $d^2$, which rod passes through the upper head of cylinder $D^3$ and rests at its lower end upon piston $d'$, the rod being preferably made $+$-shaped in cross section to increase its rigidity. Valve E (shown in section in Fig. 5) is also provided with cylinders $E' E^2$ at the top and bottom of its shell, the former being elongated, as shown in Fig. 1. Within cylinder $E^2$ is located a piston, e, the stem of which extends into the valve-chamber, where it is adapted to bear against the bottom of plug $E^3$. The stem of said plug $E^3$ passes through the top of the valve-shell into cylinder E', as shown, and within said cylinder is located a loose piston, $e'$, preferably consisting of two heads united by a stem, as shown, said heads being closely fitted to the bore of the cylinder, so that said piston will remain stationary, except when pressure is exerted against one or the other of its heads.

A pipe, M, connects reservoir 2 with cylinder E', entering the latter near its lower end, as shown, and branch pipes $m$ $m'$ connect said pipe M with cylinders D' $E^2$, respectively, entering said cylinders through the bottom thereof. A pipe, N, connects reservoir 1 with cylinder E', entering the latter at the top thereof, and in said pipe is located a check-valve, n, which is of the usual form, and which obstructs the passage of fluid or liquid through pipe N to the cylinder, but permits the same to pass freely through said pipe from the cylinder. A branch pipe, N', containing valve $n'$, connects that portion of pipe N upon one side of valve n with the portion thereof upon the opposite side of said valve, as shown in Fig. 1. Such construction enables me to regulate the admission of fluid or liquid to the upper end of cylinder E' by means of valve $n'$, while a free exhaust movement thereof from said cylinder at its upper end is permitted by check-valve n. An additional pipe, O, connects reservoir 6 with cylinder $D^3$, entering the latter near the bottom thereof.

Primary valves A A' $A^2$ have their opposite cylinders connected with the reservoirs by pipes, as follows: valve A by pipe $a^5$ with reservoir 1 and by pipe $a^6$ with reservoir 2, valve A' by pipe $a^7$ with reservoir 3 and by pipe $a^8$ with reservoir 4, and valve $A^2$ by pipe $a^9$ with reservoir 5 and by pipe $a^{10}$ with reservoir 6.

The operation of the apparatus thus constructed is as follows: Presuming pipe H' to lead from some convenient source of water-supply, pipe F to lead from a suitable source of fluid or liquid under pressure, the plug of valve C to be in its highest position and that of valve E to be in its lowest position, the plug of valve D will be held in its highest position by the fluid or liquid under pressure distributed from reservoir 6 through pipe O to cylinder $D^3$. In this position of said secondary valves primary valves A A' $A^2$ will be closed, as will be obvious from the above-described arrangement of the distributing-pipes leading to said valves, and by reference to Fig. 2 of the drawings. The parts will remain in such position until water is admitted to cylinder H through pipe H', and by filling said cylinder causes it to descend, moving the plug of valve C to its lowest position. Such movement of said valve permits the fluid or liquid under pressure to pass from pipe F to reservoir 2, and from thence through pipe $a^6$ to primary valve A, whereby the latter valve is opened, the exhaust movement taking place from the opposite cylinder of said valve through pipe $a^5$, reservoir 1, and secondary valve C to pipe G. Simultaneously with such movement the fluid or liquid under pressure passes from said reservoir 2 through pipe M to cylinders D' E' $E^2$, moving piston d in the former to its highest position, where its stem abuts against the lower end of plug $D^2$ and moving pistons e $e'$ to their highest position, the former carrying with it plug $E^3$ of valve E. By this movement of valve E the fluid or liquid under pressure is permitted to pass from pipe F to reservoir 5, and from thence through pipe $a^9$ to primary valve $A^2$, opening the latter, the exhaust movement therefrom occurring through pipe $a^{10}$ and reservoir 6 to pipe G. A similar exhaust movement occurs from cylinder $D^3$ of valve D through pipe O; but the plug $D^2$ of said valve is still retained in its highest position by piston d, which has been moved to its highest position, as just described.

The time during which the parts will remain in the last-described position—that is to say, with primary valves A and $A^2$ open, valve A' still being closed—is governed by the size of outlet-pipe $H^2$ of cylinder H, as previously stated, which will be regulated according to the function performed by the several primary valves in the particular organization with which the apparatus is used.

As soon as all the water within cylinder H has escaped therefrom, weight K' returns it to its highest position, thereby again admitting the fluid or liquid from pipe F to reservoir 1, and closing primary valve A, the exhaust movement occurring through pipe $a^6$ and reservoir 2. An exhaust movement also occurs through pipe M from cylinders D' E' $E^2$, thereby permitting weight $D^4$ to move plug $D^2$ of valve D to its lowest position. Such movement of valve D admits the fluid or liquid under pressure to reservoir 4, from whence it passes through pipe $a^8$ to primary valve A' and opens the latter. The upward movement of cylinder H just described also permits the fluid or liquid to pass from reservoir 1 through pipe N; but as it cannot pass check-valve $n$ said fluid or liquid is diverted through pipe N', and its passage through the latter pipe to cylinder E' is governed by valve $n'$, as hereinbefore described. Said valve $n'$ will be set in such manner that the time required for the fluid or liquid permitted to pass therethrough to move piston $e'$ from the top to the bottom of cylinder E' will correspond to the time desired to elapse between the last-described movement of the primary valves and the next movement thereof. As said piston $e'$ approaches the bottom of cylinder E', it is brought into contact with the upper end of the stem of plug $E^3$, and by its continued movement returns said plug to its lowest position, thereby causing the fluid or liquid to be distributed from reservoir 6 through pipe $a^{10}$ to primary valve $A^2$, closing the latter. At the same time the passage of said fluid or liquid from reservoir 6 through pipe O to cylinder $D^3$ moves piston $d'$ and plug $D^2$ of valve D to their highest position, whereby by distribution of the fluid or liquid from reservoir 3 through pipe $a^7$ primary valve A' is closed, and the parts are restored to their normal positions, ready to repeat the above-described operation whenever water is again admitted to cylinder H.

It will be observed from the foregoing description that from the time when water is admitted to cylinder H the apparatus assumes entire control of the primary valves and automatically causes them to operate in a regular sequence, the intervals between the several movements thereof being accurately predetermined. It will be observed, furthermore, that the movements of the secondary valves are positive in both directions, and that the movements of two of said valves are dependent upon the movement of the third valve.

It is obvious that the number of primary valves to be operated from either pair of reservoirs can be increased or diminished at will, and that the relative movements of said valves will be governed by the particular reservoirs to which their opposite cylinders are connected. I therefore do not wish to limit myself to the exact number of primary and secondary valves and reservoirs, nor to the exact relative arrangement of said parts and their connecting-pipes, herein shown and described, as modifications therein can be made without departing from the spirit of my invention.

Having thus fully described my invention, what I claim, and desire to secure by Letters Patent, is—

1. The combination, with a series of pressure-actuated primary valves, of a series of reservoirs for fluid or liquid under pressure, said reservoirs being arranged in pairs, and each pair being connected by pipes with one or more of said primary valves, secondary valves C D E, each of which is operatively connected with one of said pairs of reservoirs, a water-receptacle and weight connected to the plug of said valve C for moving said plug in opposite directions, cylinders $D'D^3$, containing pistons operatively connected with the plug of said valve D, weight $D^4$, connected with the piston of said cylinder $D^3$, cylinders $E'E^2$, containing pistons operatively connected with the plug of said valve E, pipes connecting one of the reservoirs governed by valve C with the lower ends of cylinders $D'E'E^2$, a pipe connecting the second reservoir governed by valve C with the upper end of cylinder E', a pipe connecting one of the reservoirs governed by valve E with cylinder $D^3$, pipe F, connecting each of said secondary valves with a primary source of fluid or liquid under pressure, and a waste-pipe leading from each of said secondary valves, arranged and operating substantially as and for the purpose described.

2. The apparatus herein described for automatically controlling the operation of pressure-actuated primary valves, consisting of the series of reservoirs 1 2 3 4 5 6, arranged in pairs, valve C, connected to reservoirs 1 2, said valve having connected with its plug a water-receptacle and weight for moving said plug in opposite directions, valve D, connected to reservoirs 3 4, said valve having cylinders $D^3 D'$ at the top and bottom of its shell, respectively, the former of which cylinders contains a piston secured to the upper end of the stem of plug $D^2$ of said valve, and is provided with a weight resting upon said piston, and the latter of which cylinders contains a piston, the stem of which projects within the chamber of said valve, valve E, connected to reservoirs 5 6, said valve having the stem of its plug $E^3$ projected within a cylinder, E', containing piston $e'$, and having at the bottom of its shell cylinder $E^2$, containing piston $e$, the stem of which projects within the chamber of said valve, pipe M, connecting reservoir 2 with cylinders $D'E'E^2$ at the bottom of the latter, pipe N, connecting reservoir 1 with cylinder E' at the top of the latter, said pipe having check-valve $n$ therein, and having branch pipe N', containing valve $n'$, and pipe O, connecting reservoir 6 with cylinder $D^3$, substantially as set forth.

GEORGE H. MOORE.

Witnesses:
W. H. CHAPMAN,
T. M. BROWN.